No. 649,623. Patented May 15, 1900.
J. A. WESER.
AUTOMATIC MUSICAL INSTRUMENT.
(Application filed Jan. 13, 1900.)

(No Model.) 5 Sheets—Sheet 1.

Fig.1.

WITNESSES: INVENTOR
Geo. B. Rowley, John A. Weser
Peter A. Ross BY
Henry Connett
ATTORNEY

THE NORRIS PETERS CO., PHOTO-LITHO., WASHINGTON, D. C.

No. 649,623. Patented May 15, 1900.
J. A. WESER.
AUTOMATIC MUSICAL INSTRUMENT.
(Application filed Jan. 13, 1900.)
(No Model.) 5 Sheets—Sheet 2.

WITNESSES:
Geo. B. Rowley
Peter N. Ross

INVENTOR
John A. Weser
BY
Henry Connett
ATTORNEYS

THE NORRIS PETERS CO., PHOTO-LITHO., WASHINGTON, D. C.

No. 649,623. Patented May 15, 1900.
J. A. WESER.
AUTOMATIC MUSICAL INSTRUMENT.
(Application filed Jan. 13, 1900.)
(No Model.) 5 Sheets—Sheet 4.

WITNESSES:
Geo. B Rowley
Peter N. Ross

INVENTOR
John A. Weser
BY
Henry Connett
ATTORNEY

THE NORRIS PETERS CO., PHOTO-LITHO., WASHINGTON, D. C.

No. 649,623. Patented May 15, 1900.
J. A. WESER.
AUTOMATIC MUSICAL INSTRUMENT.
(Application filed Jan. 13, 1900.)

(No Model.) 5 Sheets—Sheet 5.

WITNESSES:
F. W. Zliman
Peter A. Ross

INVENTOR
John A. Weser
BY
Henry Connett
ATTORNEY

UNITED STATES PATENT OFFICE.

JOHN A. WESER, OF NEW YORK, N. Y.

AUTOMATIC MUSICAL INSTRUMENT.

SPECIFICATION forming part of Letters Patent No. 649,623, dated May 15, 1900.

Application filed January 13, 1900. Serial No. 1,327. (No model.)

*To all whom it may concern:*

Be it known that I, JOHN A. WESER, a citizen of the United States, residing in the borough of Manhattan, in the city, county, and State of New York, have invented certain new and useful Improvements in Automatic Musical Instruments, of which the following is a specification.

This invention relates to the class of automatic musical instruments wherein a perforated strip of paper wound from one roller onto another by some motive power controls the sounding of the notes, and as herein shown the invention is represented as applied to an automatic piano constructed according to the invention illustrated and described in my pending application, Serial No. 678,832, filed April 26, 1898.

The object of the present invention is in part to provide an automatic rewinding mechanism for the perforated music-strip, in part to provide an automatic guide for keeping said strip in register during its movement, in part to provide an automatic stop device to arrest the movement when the strip is wound up, in part to improve the automatic means for depressing the key-levers out of the way of the music-strip during the rewinding, and in part to provide other and minor improvements, which will be hereinafter described.

The invention is illustrated in the accompanying drawings, wherein—

Fig. 13 is an enlarged side view, Fig. 14 is a plan, and Figs. 15 and 16 are fragmentary detail views, of the devices for automatically guiding and controlling the register of the music-strip. Fig. 17 is a fragmentary detail view of the device for depressing the key-levers.

It has not been considered necessary in this application to illustrate fully the entire musical instrument for the reason that this has been done in my before-mentioned pending application and for the additional reason that my present invention is not restricted in its application to this particular kind of instrument. It will only be necessary to say that the automatic piano (seen in Fig. 1) is adapted to be and is supposed to be operated by an electric motor, which drives the winding-rolls carrying the perforated music-strip and also actuates the hammers which strike the strings of the instrument.

Figure 1:
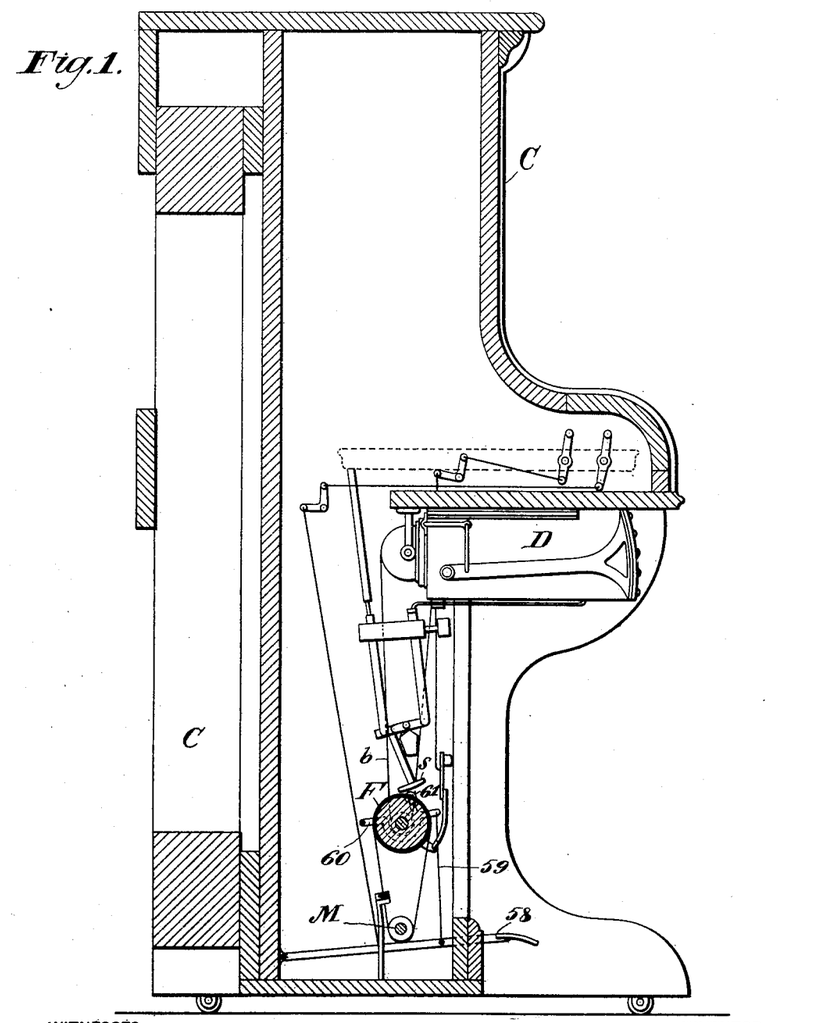
Figure 1 is a general view, on a relatively-small scale, of a piano to which my invention is applied, the view being a vertical transverse section.

In Fig. 1, C represents the case of the upright piano. M is the motor-shaft from which power is derived for actuating the hammers and the music-strip, and D is the drawer under the keyboard of the piano, which contains the music-strip and rolls and carries substantially all of the mechanism included in the present invention.

Referring now to the more detailed figures of the drawings, 1 is the roll which carries the perforated music-strip S and upon which it is rewound, and 2 is the roll upon which the said strip is wound or taken up in playing. On the prolonged journal $2^{\times}$ of the roll 2 is mounted and secured by a clutch a beveled gear-wheel 3, with which gears at all times a pinion 4 on a shaft 5, which derives motion from the electric motor. On the prolonged journal $1^{\times}$ of the roll 1 is fixed a beveled gear-wheel 6, which is at all times in gear with a pinion 7, fixed on one end of a rotatable shaft 8, which shaft has fixed on its other end a pinion 9. This pinion 9 is always out of gear with the wheel 3 when the instrument is playing, but is adapted to be put in gear with said wheel for rewinding, as will be now explained with especial reference to Figs. 8, 9, and 10.

Figure 8:
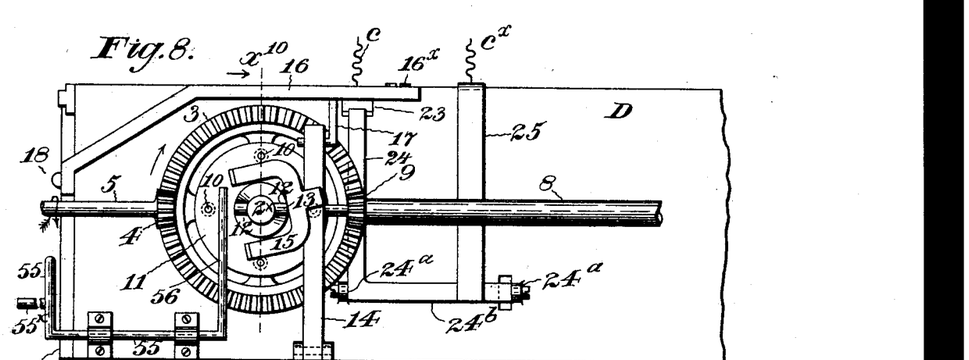
Fig. 8 is an enlarged detail view of the parts seen at the left in Fig. 6.
Figure 9:
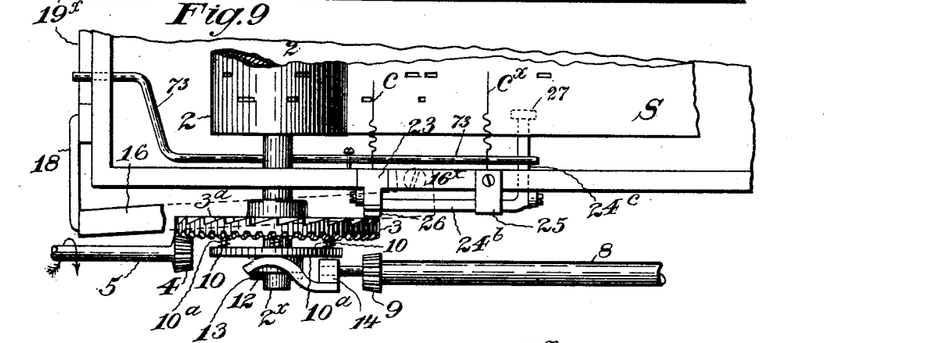
Fig. 9 is a plan of the same.
Figure 10:
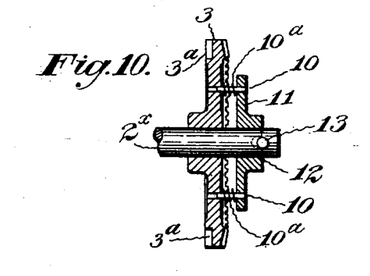
Fig. 10 is a section at line $x^{10}$ in Fig. 8, from which some of the parts are omitted.
Figures 11, 12:
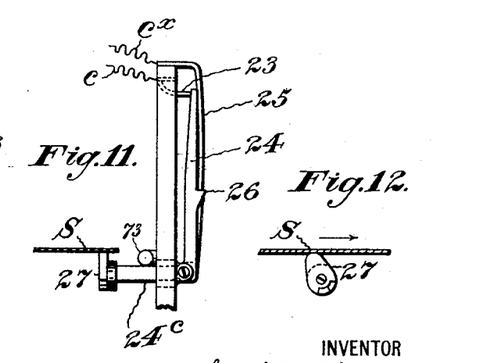
Figs. 11 and 12 are detail views of the stop mechanism.

Mounted to slide on pins 10 in the face of the wheel 3 and backed by a suitable spring or springs $10^a$ is a clutch-disk 11, slidable on the journal $2^\times$ and provided on its outer face with two ratchet-like driving-teeth 12 to be engaged by a cross-pin 13 in the journal $2^\times$. The clutch-disk is held in engagement with this pin 13 by the springs $10^a$, and while thus engaged the roll 2 is driven from the wheel 3.

An upright 14, hinged at its lower end to the drawer D, is provided with a forked finger-piece 15, which bears on the outer face of the clutch-disk 11, and said upright also provides a bearing for the journal on this end of the shaft 8. Obviously by pressing in the upper end of the upright 14 toward the drawer D the finger-piece 15 will press back and disengage the clutch-disk 11 from the pin 13, and thus loosen the wheel 3 from the roll 2; but at the same time the teeth of the pinion 9 will be put in gear with those of the wheel 3, and the continued rotation of the latter wheel will act, through the pinion 9, shaft 8, and pinion 7, to drive the roll 1 in the proper direction to rewind the music-strip S thereon.

The above-described shifting of the gears for rewinding is effected automatically by means that will now be described with especial reference to Figs. 2 to 10.

Figure 4:
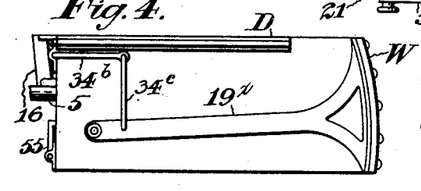
Figs. 4 and 5 are respectively views of the left-hand and right-hand ends of said drawer.
Figure 5:
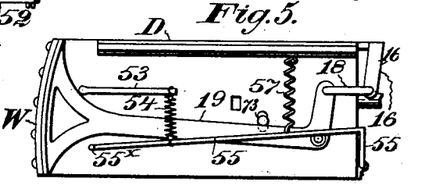
Figure 6:
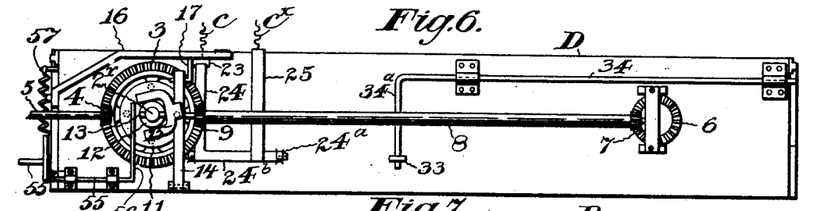
Fig. 6 is a rear elevation of the drawer. These views are on a larger scale than Fig. 1.

A lever 16, bent to the convenient shape shown, is fulcrumed at $16^\times$ on the drawer and carries a pendent hook-arm 17, which engages a hole in the upper extremity of the upright 14, and the free arm of this lever 16 is coupled, Fig. 5, by a link 18 to an upright branch on one of two arms 19 and $19^\times$, which are pivotally attached to the respective ends of the drawer D, Figs. 4 and 5, and carry an operating-weight W, which in the principal views forms the front of the drawer. This weight is upheld, Fig. 3, by a retaining lever-latch 20, fulcrumed on the drawer, the outer end of said latch being made to take under a stud 21 on the inner face of the weight W by any suitable latch-spring $20^\times$, and thus support said weight. To trip the latch 20 and allow the weight to fall, there is a transversely-arranged lever 22 on the drawer, this lever bearing against the inner arm of the lever-latch. The lever 22 carries at its free end, Figs. 2 and 3, an upright stud $22^\times$, which bears or presses lightly on the under surface of the music-strip S as the latter is drawn over it (moving to the right in Fig. 2) in playing. The music-strip has in it a perforation or aperture, ($a$ in Fig. 3,) which when the air or tune is finished comes to register with the stud $22^\times$. Said stud protrudes upward through the aperture, is engaged by the strip, and the lever 22 moved to the right in Figs. 2 and 3, and the latch 20 thus shifted so as to allow the weight W to fall. The rewinding now begins by the action of the weight through the lever 16 on the clutch device and continues until arrested by a stop device, which will now be described with especial reference to Figs. 8 to 12.

There is a break in the operating-circuit $c\ c^\times$ of the instrument at one side of the drawer D, of which break a contact-piece 23 on the side of the drawer forms one terminal and an upright metal arm 24, mounted to rock a little in pivot-bearings $24^a$ on the drawer, forms the other terminal. A light leaf-spring 25 on the drawer tends to break the circuit and at the same time to swing the arm 24 outward far enough for a beveled detent-tooth 26 thereon to engage ratchet-teeth $3^a$ on the inner face of the wheel 3. To maintain the electrical contact at the said break, the lower bar $24^b$ of the arm 24 has a short branch $24^c$, Fig. 11, which passes through an aperture in the back of the drawer D and carries on its inner extremity a loosely-mounted nosepiece 27, which bears on the under surface of the passing music-strip S, the latter pressing down the nosepiece during the rewinding, and thus maintaining the circuit unbroken. When, however, a suitably-placed aperture in the music-strip comes to register with the nosepiece 27, the spring 25 is left free to act and break the circuit, thus stopping the current through the motor, while the detent 26 promptly arrests the motion of the driven parts due to momentum. The piece 27 has a little play or rocking motion on the arm $24^c$, so that it can yield a little to the pull of the music-strip, and thus obviate the tearing of the latter.

Figures 2, 3:
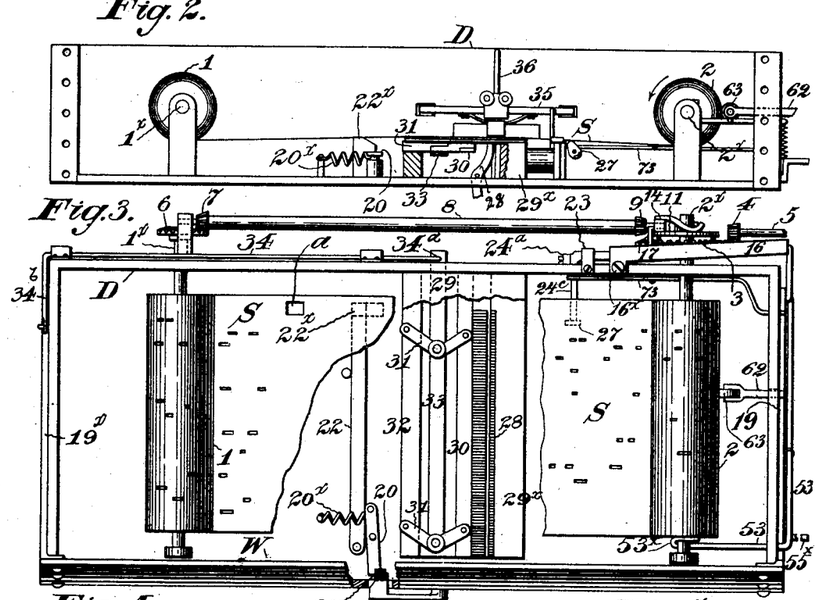
Fig. 2 is a front elevation of the drawer, in and on which are mounted the various mechanisms for controlling the movements of the music-sheet.
Fig. 3 is a plan of said drawer, showing the interior thereof.

During rewinding it is very desirable that the key-levers 28 shall be depressed a little in order that they may clear the music-sheet which is passing over them, and automatic means are herein provided for effecting this depression when the weight W falls. Before describing the depressing device it may be well to explain that in the drawer D there is mounted a supporting-plate 29, over which the music-sheet plays in its movements to and fro, and that under said plate, arranged abreast, are the key-levers 28. These levers correspond each to a key and string of the piano, and when a note is to be sounded an aperture in the music-sheet S comes into register with the proper key-lever, the upper extremity of which projects up through the apertured plate 29 and bears on the under side of the strip S, and this permits the lever to rock on its fulcrum and permit the shoe to drop on the roller and the note to sound; but when the weight W falls it depresses the entire set of key-levers 28. To effect this result, a bar 30 extends across in front of the upper ends of said levers, and this bar is connected by toggles 31, Fig. 3, with a fixed bar 32 on the under side of the plate 29. To the knuckles of the toggles is coupled a transverse rod 33, to which is loosely coupled the crank-arm $34^a$ on one end of a shaft 34 on the back of the drawer D, Fig. 6, said shaft having another crank-arm $34^b$, Fig. 4, which is coupled by a link 34° with the arm 19ˣ of the weight W. When the weight falls, the shaft 34 is rocked and the rod 33 drawn out, so as to straighten or partially straighten the toggles, thus causing the bar 30 to press backward and downward the upper ends of the key-levers 28. The supporting-block 29ˣ, Fig. 17, of the plate 29 has formed in its upright edge a series of kerfs or recesses adapted to receive the upper arms of said levers when they are pressed back. In Fig. 3 a part of the music-sheet S and a part of the supporting-plate 29 are broken away in order to better disclose the mechanism beneath.

It is very desirable that the music-sheet S be properly held down to the plate 29 at the point where the key-levers are situated and that the said strip while moving should be held in place during its movement, so that the usual longitudinal lines of apertures therein may be kept in register with their respective key-levers, and the devices for effecting these objects are illustrated best in Figs. 13 to 16.

Figure 13:
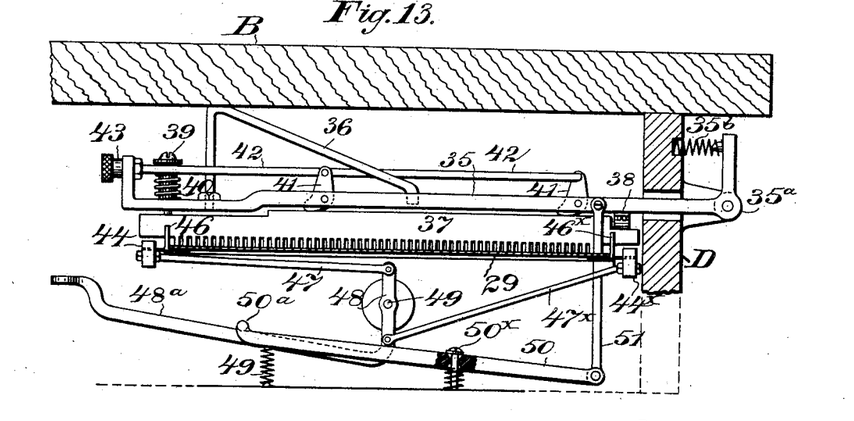
Figures 14, 15, 16, 17:
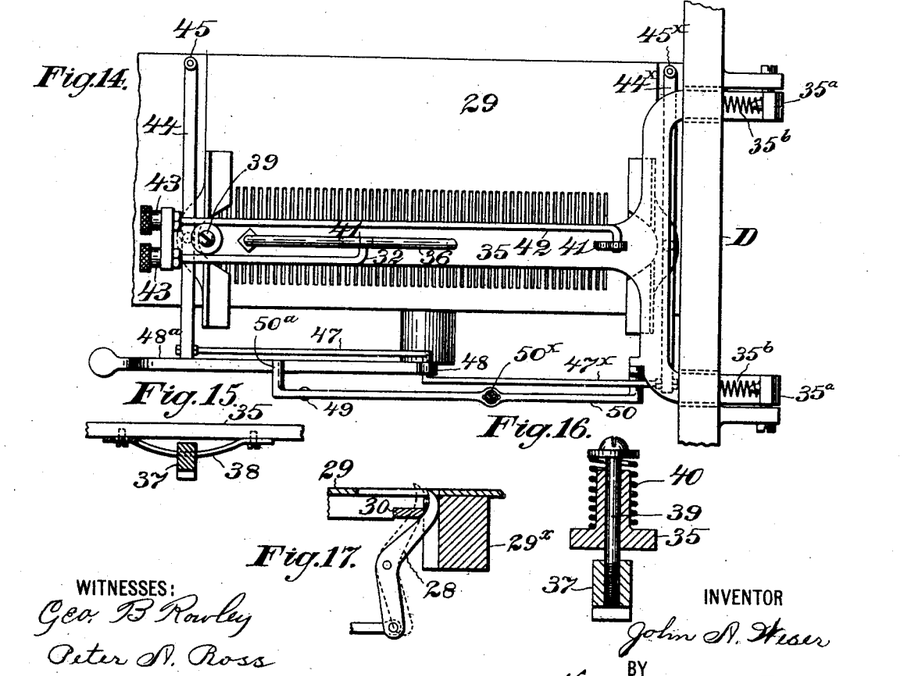

The plate 29 is slotted, as usual, for the reception of the upper arms of the key-levers 28, and extending across over said plate is a carrying-arm 35, pivotally mounted in a bracket on the back of the drawer D at 35ᵃ. Springs 35ᵇ between the drawer and upright branches on the carrying-arm at the pivots tend to throw up the free or front end of said arm, and an inclined upright wiper 36 on the carrying-arm is adapted to take under the board B over the drawer and depress said arm when the drawer is pushed in.

Mounted on the under side of the carrying-arm 35 is a pressure-bar 37, which has elastic or cushioned attachments to the arm. This bar 37, which is kerfed at its under side, so as to bear on the music-sheet only between the rows of perforations therein, is secured at its inner end to a bow-spring 38, Figs. 13 and 15, said spring being secured to the under side of the carrying-arm 35, and at its front or outer end said bar is fixed to an upright screw or stem 39, which plays in an aperture in the arm 35, a compression-spring 40 being interposed between the head of said screw and said arm. In order to carefully regulate the pressure of the bar 37 on the music-strip, two rocking cams 41 are pivotally mounted in the arm 35, as seen in Fig. 13, and adapted to bear on the back of the bar 37, and the upper arm of each of these cams is pivotally coupled to an operating-rod 42. The two rods 42 extend forward through an upturned flange on the arm 35 and have nuts 43 on their respective screw-threaded extremities. By means of these rods and nuts the cams 41 may be rocked so as to depress the bar 37 to the exact extent required.

The music-strip S being usually of paper or other material which tends to become distorted slightly under the influences of weather and climate is apt to run out of line or veer slightly from one side to the other, and as it must travel in a straight line in order to produce good and equable results automatic means are herein employed to keep it in line and register.

Mounted in the drawer D and extending in the direction of the moving strip S are two like arms 44 and 44ˣ, pivotally mounted at 45 and 45ˣ so as to swing laterally, and on these arms are mounted, respectively, two flanged guides or keepers 46 and 46ˣ, which embrace the respective edges of the moving music-sheet and keep it alined. The arms 44 and 44ˣ are coupled, respectively, by links 47 and 47ˣ to the respective upper and lower arms of a lever 48, fulcrumed at 49 in the drawer under the music-strip. By rocking the lever 48 on its fulcrum the keepers 46 and 46ˣ may be moved simultaneously inward or outward at will. Any lateral pressure on one of the keepers causes them to separate or move apart, and a pressure exerted on the outwardly-projecting arm 48ᵃ of the lever 48 also spreads apart said keepers. A relatively-light spring 49 under the arm 48ᵃ tends to hold the keepers or guides up in line with the sheet and in their normal positions. In order that the guides 46 and 46ˣ may be spread apart when the drawer D is drawn out, and thus have the music-strip S free for adjustment, a lever 50 is employed. This lever has a cushioned fulcrum at 50ˣ in the drawer. One arm of the lever is coupled by a link 51 to the arm 35, and the other arm has a lateral branch 50ᵃ, which takes over the arm 48ᵃ of the lever 48. When the drawer D is drawn out, the springs 35ᵇ raise the arm 35 and, through the link 51, rock the lever 50, thus causing its lateral branch 50ᵃ to rock the lever 48 and separate the guides or keepers of the music-strip.

Figure 7:
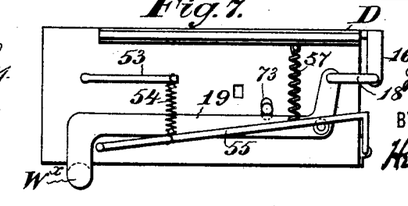
Fig. 7 is a view similar to Fig. 5, illustrating a slightly-modified form and construction of the operating-weight.

It is preferred to employ the wooden front of the drawer D as a weight and to provide it with a spring-push 52, Fig. 3, having a beveled nose adapted to act on and laterally displace the lever 20 when the push is pressed in, and thus free the weight W and allow it to fall. This feature is a convenience for stopping the mechanism and reversing it manually independently of the automatic devices. But it is not necessary to employ the drawer-front as a weight. In Fig. 7 (which shows the same end of the drawer as Fig. 5) the weight Wˣ is suspended from the arms 19 and 19ˣ below the bottom of the drawer.

In order that one may manually arrest the motion of the music-strip and prolong a note at will, a simple brake and shifting mechanism is employed, which will now be described with especial reference to Figs. 2, 3, 5, and 6.

An L-shaped rocking lever 53, mounted to rock in the end of the drawer D, has an upturned end 53ˣ, Fig. 3, which when said lever is rocked presses against the end of the roll 2 and acts as a brake to check its rotation. The outer arm of the lever 53, as seen in Fig. 5, is coupled by a spring-link 54 to another bent rocking lever 55, mounted in bearings at the back of the drawer D, and provided with an arm or thumb-piece 55×, which projects out where it can be pressed upon in order to arrest the motion of the music-sheet. It will be obvious, however, that unless the roll 2 be thrown out of gear with the driving-pinion 4 the proper braking effect cannot be produced, and hence the bent lever 55 is provided with an upright arm 56, (seen best in Figs. 6 and 8,) which when this lever is rocked by pressure on the arm 55× presses back the clutch-disk 11 out of gear with the journal 2× of the roll 2. When pressure is removed from the arm 55×, the parts resume their normal positions through the influence of springs 57 and 10×. (Seen best in Figs. 5 and 10.)

In Fig. 1 is illustrated a means operated by the foot for momentarily arresting the rotation of the friction-drum F, which actuates the hammers through the shoes s, as described in my pending application before mentioned. This drum is driven through an elastic belt b. A pedal 58 is mounted in the lower part of the case C, and this pedal is coupled by a connector 59 to the end of a lever 60, also mounted in the case. This lever carries a roller-stud 61, which takes inside the belt b above the drum F, and when the pedal 58 is depressed the roller 61 descends and stretches the belt b until it is practically free from the pulley on the drum, when the latter ceases to rotate.

Figure 18:
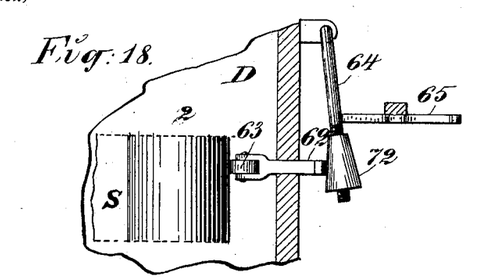
Figs. 18 to 20 are fragmentary detail views of the speed-regulator.
Figure 19:
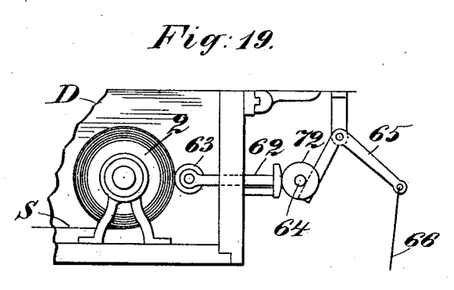
Figure 20:
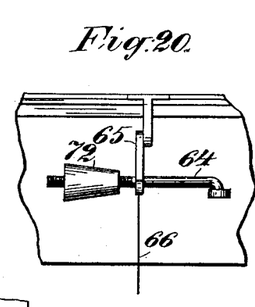
Figure 21:
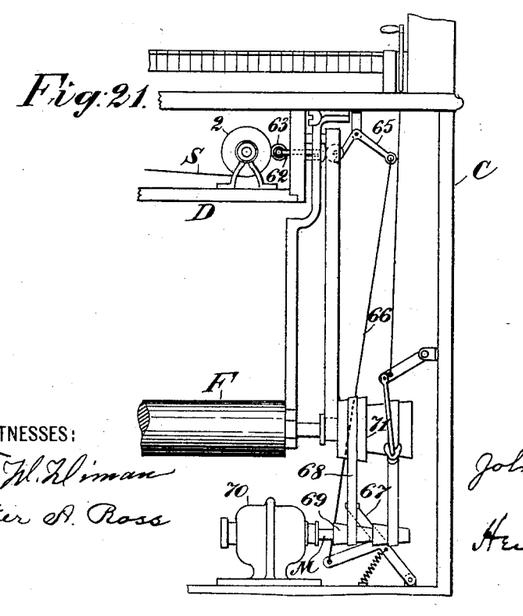
Fig. 21 is a front view of a part of the instrument on the same scale as Fig. 1, illustrating the application of the speed-regulator.

When the music-strip S rolls up on the roll 2, the roll gradually enlarges, and while the rotary speed or velocity remains the same the strip travels gradually faster and faster. To obviate this, a speed-regulator is employed to reduce the velocity or speed of the roll 2 proportionately to the gradual increase in diameter due to the rolling up of the music-strip thereon. This regulating device is illustrated in Figs. 18 to 21 and will now be described. Fig. 18 shows the device in plan, Fig. 19 is a side view, and Fig. 20 is a view from the right in Figs. 18 and 19. The roll 2 is seen with a part of the strip S wound thereon. Mounted to slide in the end of the drawer D is a slide 62, carrying at its inner end a roller 63, which bears on the strip wound on the roll. As the roll increases in diameter the slide 62 is pushed outward and its outer end, which bears on a lever 64, fulcrumed on the drawer, presses said lever outward. The lever 64 bears on one arm of a bell-crank lever 65, fulcrumed on the instrument-case, and the other arm of the last-named lever is coupled by a connector 66 with an arm on a belt-shifter 67, Fig. 21, which shifts the belt 68 along the cone-pulley 69 on the shaft of the motor 70 and along the counter cone-pulley 71, from which the music-strip is driven, thus reducing the speed of said pulley 71 proportionately to the increase in diameter of the roll 2. The relative positions of the parts are made capable of nice adjustment by means of a cone-shaped bearer 72, screwed onto the lever 64 in such a manner that by shifting it along said lever the outer end of the slide 62 may be made to bear on it at any desired point in its length. The object in mounting the lever 65 on the instrument-case and the lever 64 on the drawer is to enable the drawer to be moved without disturbing the lever 65 and connector 66.

It will be obvious that modified and equivalent constructions may be employed in lieu of those shown and described without departing from my invention. I have shown what I believe to be the best mode of and means for carrying out the invention.

It will be noted, as before stated, that when the nosepiece 27 engages a suitably-placed aperture in the music-strip the spring 25 breaks the circuit through the motor (as 70 in Fig. 21, for example) and the rewinding of course is arrested. At this time the weight W (or W×, as the case may be) will be down. Now in order that the replacing of the weight—that is, the reclosing of the drawer-front—may again close the circuit through the motor automatic means are or may be provided, which will now be described with especial reference to Figs. 2, 3, 5, 9, and 11.

On the inner face of the back of the drawer D is fulcrumed a lever 73, one arm of which extends over and bears on the arm 24ᶜ and the other arm of which projects through a slot in the adjacent end of the drawer D, as seen in Fig. 5, out over the arm 19, which supports the weight W at that end. Normally the arm 19 raises the outwardly-projecting arm of the lever 73, thus depressing the other arm thereof and with it the arm 24ᶜ, and thereby putting the terminal arm 24 into contact with the terminal 23, so as to complete the operating electric circuit; but when the weight W falls this pressure on the lever 73 is removed, and the circuit will then be held closed only by the pressure of the nose-piece 27 on the under side of the music-strip.

It will be noted that the front W of the drawer D is adapted to open by a swinging movement about the points of attachment of the lever-arms 19 and 19×, so as to descend edgewise and open the drawer at the front. This construction avoids inconveniences of the construction where the drawer-front is hinged at its lower edge and opens outward. The object in providing the arm 35 with two widely-separated hinging branches (seen in Fig. 14) and two hinging-points 35ª is to give steadiness of movement to the arm and avoid the necessity of a guide or keeper at its front end.

By providing independent means for depressing the bar 37 at opposite ends while the music is playing the depression of said bar may be carefully regulated under the guidance provided by the musical sounds which direct the operator in the regulation. It will be noted that the ends of the pressure-bar 37 may be independently depressed by the rods 42.

Having thus described my invention, I claim—

1. In an automatic musical instrument, a traveling music-sheet, a weighted and normally-supported shifting-lever, means operated by said sheet for freeing said weighted lever, mechanism for moving the music-sheet, and shifting mechanism, actuated by said weighted lever for reversing the direction of movement of the music-sheet, substantially as set forth.

2. In an automatic musical instrument, a traveling music-sheet, rolls for winding said sheet, mechanism for driving the take-up roll in playing, and for driving the other roll in rewinding, a normally supported and weighted shifting-lever, means operated by the moving music-sheet for freeing said lever, and shifting mechanism actuated by said lever for shifting the driving power from the take-up roll to the other roll for rewinding, substantially as set forth.

3. In an automatic musical instrument, the combination with the rolls 1 and 2, the music-sheet which winds from one roll onto the other, the driving-shaft 5, the wheel 4 thereon, the wheel 6 on the journal of the roll 1, the shaft 8, the wheel 7 thereon, in gear with the wheel 6, and the wheel 9 thereon, of the wheel 3, on the journal of the roll 2, and in gear with the wheel 4, a clutch which normally couples the wheel 3 to said journal, and means, substantially as described for simultaneously uncoupling the wheel 3 from the journal and putting the wheel 9 in gear therewith for rewinding, substantially as set forth.

4. In a rewinding mechanism for automatic musical instruments, the combination with the rolls 1 and 2, the wheel 3, clutched normally to the journal of the roll 2, the driving-shaft, and a wheel 4 thereon in gear with the wheel 3 for driving said roll, of a driving-shaft 8, and gearing for driving the roll 1 therefrom, said shaft having a swinging bearing adjacent to the wheel 3, the wheel 9 on the shaft 8, and means for simultaneously moving said wheel 9 into gear with the wheel 3, and for unclutching the latter, substantially as set forth.

5. In an automatic musical instrument operated by an electric motor, the combination with the apertured music-strip, the rolls 1 and 2, and the wheel 3 on the journal of the roll 2, said wheel having teeth $3^a$, of mechanism whereby the music-strip, at the termination of the rewinding, breaks the operating-circuit and checks the rotation of the roll 1, said mechanism comprising a rocking frame having an arm and nosepiece which takes under the moving music-strip, and having also a spring tending to press the nosepiece up against said music-strip and to open the operative circuit, and a detent-tooth 26, whereby when an aperture in the music-strip comes to register with said nosepiece, said spring rocks said frame and simultaneously breaks the circuit and puts the detent 26 into engagement with the teeth $3^a$, as set forth.

6. In an automatic musical instrument operated by an electric motor, the combination with the apertured music-strip, the rolls 1 and 2 therefor, the wheel 3 on the journal of the roll 2, means for driving said wheel 3 from the motor, and means between the wheel 3 and roll 1, whereby the former drives the latter for rewinding, of the operating-circuit, having in it a break, means whereby the imperforate portion of the moving music-strip maintains the circuit closed at said break, a spring which opens said break when the strip is rewound, and means, actuated by said spring, for arresting the movement of the strip at the moment the circuit is broken, substantially as set forth.

7. In an automatic musical instrument, the combination with a traveling music-strip, a rewinding mechanism therefor, and a drawer D, having a front W, carried by arms 19 and $19^\times$ and adapted to open by a downward-swinging movement, of the said arms, means for supporting said front when closed, and mechanism between said drawer-front and the rewinding mechanism whereby the former, by opening, sets the latter in operation, substantially as set forth.

8. In an automatic musical instrument, the combination with the rewinding mechanism, and the weight which operates the latter, of the lever-latch 20, the stud 21 on the weight and taking over said latch to support the weight, and the latch-displacing lever 22, provided with a stud $22^\times$ to engage the music-strip at the proper moment for rewinding, substantially as set forth.

9. In an automatic musical instrument, the combination with the rewinding mechanism, and the weight and levers which operate the latter, said weight having a projecting part which takes over a retaining spring-latch, the said retaining-latch 20, and the spring-push on the weight, adapted to displace said latch, substantially as set forth.

10. In an automatic musical instrument, the combination with the traveling music-strip, and the plate over which it moves, of the movable keepers for the strip situated at the respective opposite edges thereof, means connecting said keepers whereby they are compelled to move simultaneously in opposite directions, and means which press said keepers yieldingly toward each other, whereby pressure of the moving strip laterally outward on one of said keepers automatically moves the keepers away from each other automatically, substantially as set forth.

11. In an automatic musical instrument, the combination with the traveling music-sheet, and the plate over which it moves, of the movable keepers 46 and $46^\times$, at the opposite, respective edges of said sheet, the lever 48, the links, 47 and $47^\times$, coupling the respective keepers to the respective arms of said lever, whereby said keepers are compelled to move in opposite directions simultaneously, and spring mechanism which presses said keepers yieldingly toward each other, whereby the pressure of the moving strip outwardly on said keepers serves to adjust them to the strip, substantially as set forth.

12. In an automatic musical instrument, the combination with the traveling music-strip, and the plate over which it moves, of the keepers 46 and 46$^\times$ at the respective opposite edges of said sheet, the pivoted arms carrying the respective keepers, the lever 48, the links coupling the respective arms and keepers to the arms of said lever, and the spring 49, operating said lever so as to cause the keepers to move toward each other, substantially as set forth.

13. In an automatic musical instrument having a drawer D, under a part B of the case of the instrument, the combination with the traveling music-strip mounted in said drawer, and the plate over which it moves, of the arm 35, hinged to the drawer and provided with a spring to throw it up and a wiper 36 to depress it when the drawer is closed, and the bar 37, below said arm and coupled thereto with spring connections, substantially as set forth.

14. In an automatic musical instrument having a drawer D, under a part B of the case of the instrument, the combination with the traveling music-strip mounted in said drawer, and the plate over which it moves, of the arm 35, hinged to the drawer and provided with a spring to throw it up and a wiper 36 to depress it when the drawer is closed, the bar 37, below said arm and coupled thereto by spring connections, and means substantially as described, mounted on the arm 35 for depressing the bar 37, substantially as set forth.

15. In an automatic musical instrument having a drawer D carrying the music-strip and its operating mechanism, the combination with the plate over which said strip moves, the keepers at the respective edges of the strip, and the lever 48, coupled at opposite sides of its fulcrum to the respective keepers, of means substantially as described for rocking said lever and thus spreading the keepers when the drawer D is drawn out, substantially as set forth.

16. In an automatic musical instrument, the combination with the slotted plate over which the music-strip moves, the series of key-levers 28, the upper ends of which engage the respective slots in said plate, and the means substantially as described for pressing down the ends of said levers when rewinding, of a weighted lever, and a rocking lever 34, coupled through its arm 34$^b$, to said weighted lever, and coupled by its arm 34$^a$ to the slide of the device for depressing the key-levers, whereby when the weighted lever falls the key-levers will be depressed, substantially as set forth.

17. In an automatic musical instrument, the combination with the music-strip, the roll 2 on which it is wound in playing, the cone-pulleys and belt which drive said roll, and a shifter for said belt, of a slide provided with a roller which bears on the sheet wound on the roll 2, and means between the said slide and the belt-shifter for operating the latter through the movement of the slide, for reducing the speed of said roll, substantially as set forth.

18. In an automatic musical instrument, the combination with the music-strip, the roll 2 on which it is wound in playing, the cone-pulleys and belt which drive said roll, and a shifter for said belt, of a slide provided with a roller which bears on the sheet wound on the roll 2, the lever 64, actuated by said slide, the lever 65, actuated by the lever 64, and the connector 66, between the lever 65 and the said belt-shifter, substantially as set forth.

19. In an automatic musical instrument, the combination with the music-strip, the roll 2 on which it is wound in playing, the cone-pulleys and belt which drive said roll, and a shifter for said belt, of a slide provided with a roller which bears on the sheet wound on the roll 2, the lever 64, provided with a conical, adjustable bearer on which the slide impinges, and means between the lever 64 and the belt-shifter whereby the former actuates the latter, substantially as and for the purposes set forth.

20. In an automatic musical instrument, the combination with a traveling music sheet or strip, a weighted and normally-supported shifting-lever, means operated by said sheet for automatically freeing said shifting-lever, and shifting mechanism actuated by said weighted lever for reversing the direction of movement of the music sheet or strip for rewinding, of automatic means for arresting the movement of the strip when it is wound up, substantially as set forth.

21. In an automatic musical instrument, the combination with a traveling music sheet or strip, a weighted and normally-supported shifting-lever, means operated by said sheet for automatically freeing said shifting-lever, and shifting mechanism actuated by said weighted lever for reversing the direction of movement of the music sheet or strip for rewinding, of automatic means for arresting the movement of the strip when it is rewound, and automatic means for setting the music-strip in motion for playing when the weight-shifting lever is again lifted, substantially as set forth.

22. In an automatic musical instrument, the combination with a music-strip and its rolls, electrical means for driving said strip, mechanism for reversing the direction of movement of said strip, a weighted and normally-upheld shifting-lever, and means operated by the moving strip for automatically freeing said shifting-lever so that it may reverse the driving mechanism in falling, of means for automatically breaking the operating-circuit when the strip is wound up, and means for closing said circuit automatically, by the lifting of said weighted lever to its normal elevated position, substantially as set forth.

23. In an automatic musical instrument, the combination with a music-strip and its rolls, electrical means for driving said strip, mechanism for reversing the direction of movement of said strip, a weighted and normally-upheld shifting-lever, and means operated by the moving strip for automatically freeing said shifting-lever so that it may reverse the driving mechanism in falling, of the circuit-breaker adapted to be actuated automatically by the moving strip at the termination of the rewinding movement, and the intermediate circuit-closing lever 73, adapted to be actuated by the elevation of the weighted shifting-lever to its normal position, substantially as set forth.

24. In an automatic musical instrument, the combination with the slotted plate over which the music-strip is drawn, and the said strip, of key-levers under said plate and adapted to be rocked so as to be below the upper surface of same, and guides for the key-levers situated below said plate, substantially as set forth.

25. In an automatic musical instrument, the combination with the slotted plate over which the music-strip is drawn, the said strip, means for driving and rewinding said strip, the pivoted key-levers below and under said plate with upper ends coincident with the slots therein, and guides for the upper ends of said key-levers underneath said plate and registering with the respective slots therein, substantially as set forth.

26. In an automatic musical instrument, the combination of the slotted plate 29, the pivotally-mounted key-levers under said plate and coincident with the respective slots therein, and the kerfed block $29^\times$, under said plate, the kerfs in said block serving as guides for the upper end of the key-levers when they are depressed, substantially as set forth.

27. In an automatic musical instrument, the combination with the traveling music-strip, and the slotted plate over which it moves, of the arm 35, having two widely-separated hinging branches to steady the arm in its movements, means for limiting the rise of said arms, the springs for pressing said arm upward, and a pressure-bar 37, under and connected yieldingly to said arm, substantially as set forth.

28. In an automatic musical instrument, the combination with the slotted plate 29, the key-levers under said plate, the carrying-arm 35, and the kerfed bar 37, beneath the arm 35, and connected yieldingly thereto, of independent means for depressing the respective ends of the bar 37, said means being adapted for operation while the instrument is being played, substantially as set forth.

In witness whereof I have hereunto signed my name, this 11th day of January, 1900, in the presence of two subscribing witnesses.

JOHN A. WESER.

Witnesses:
 CHARLES HUNTON,
 WINFIELD S. WESER.